United States Patent [19]

Inose et al.

[11] 3,824,383

[45] July 16, 1974

[54] DIGITAL CONTROL APPARATUS

[75] Inventors: Fumiyuki Inose, Kokubunji; Hisashi Thuruoka, Ome, both of Japan

[73] Assignee: Hitachi, Ltd., Tokyo, Japan

[22] Filed: Feb. 16, 1973

[21] Appl. No.: 333,154

[30] Foreign Application Priority Data

Feb. 18, 1972 Japan.............................. 47-16464

[52] U.S. Cl. ............................ 235/153 R, 235/151
[51] Int. Cl. .......................................... G05b 23/02
[58] Field of Search............ 235/151, 153 R, 153 A, 235/153 AC

[56] References Cited
UNITED STATES PATENTS 3,562,708   2/1971   Verbarg et al............. 235/153 A X Primary Examiner—Felix D. Gruber
Assistant Examiner—R. Stephen Dildine, Jr.
Attorney, Agent, or Firm—Craig and Antonelli

[57]  ABSTRACT

A digital control apparatus for repeatedly performing more than one processing, having combinational circuits (read-only memories) which nondestructively store the sequences of processings and the value of constants required for the processings, and reset means for resetting to a predetermined condition prior to carrying out the processing the contents of sequential circuits in an arithmetic unit for carrying out the processings, the contents of memory means for storing intermediate information of the processing, and the contents of an input-output control unit thereby eliminating the affects of intermittent errors.

7 Claims, 8 Drawing Figures

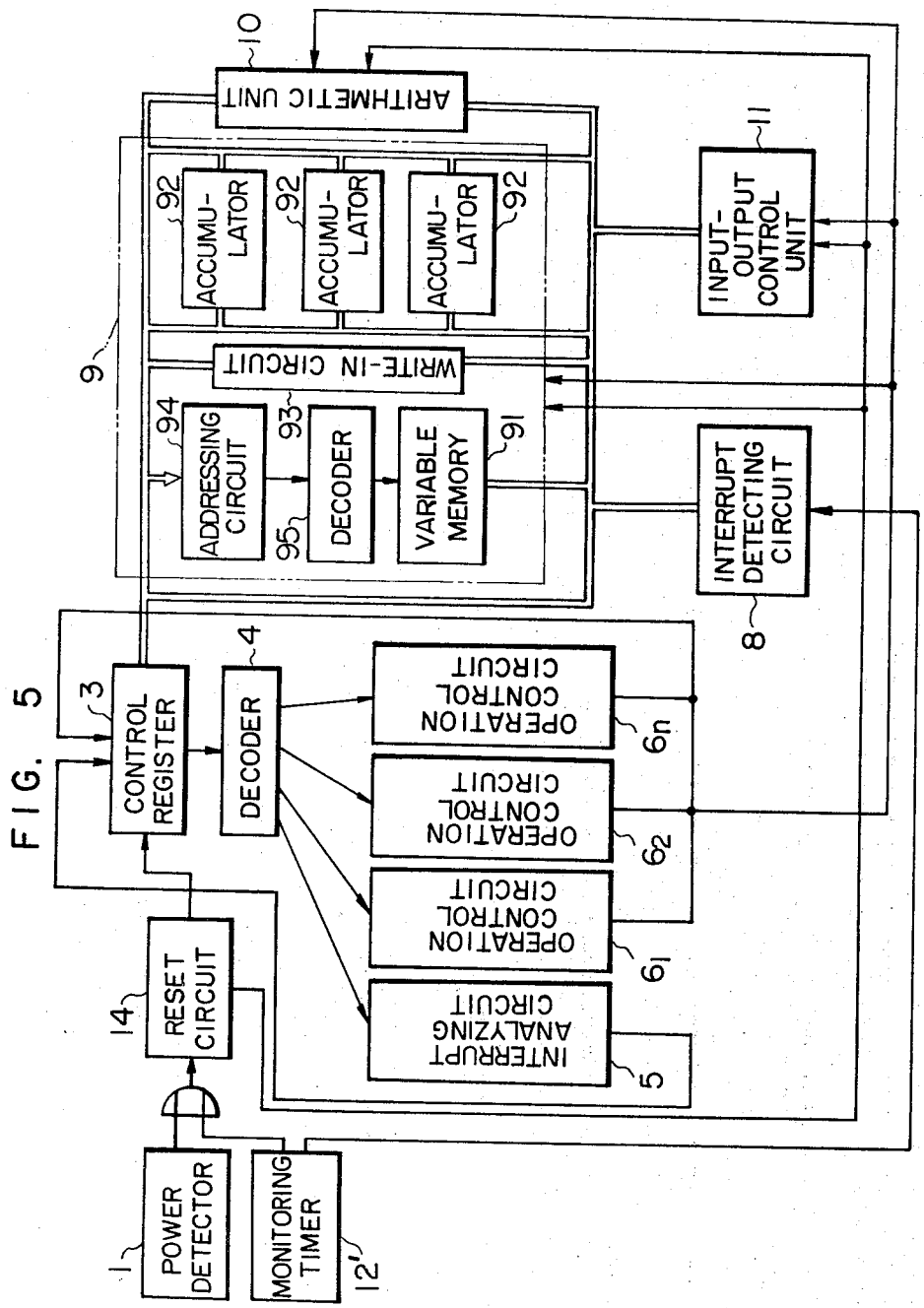

DIGITAL CONTROL APPARATUS

BACKGROUND OF THE INVENTION

1. Field of the Invention

This invention relates to a digital control apparatus used for the control in railroad or automobile transportation, and more particularly to a digital control apparatus of improved reliability and availability which can reduce the affects of intermittent errors on a control object when errors occur in sequential circuits of the control apparatus.

2. Description of the Prior Art

Digital control apparatuses for use in control of processes, railroad, air, sea and automobile transportation, and industrial robots are generally used in situations of extremely high external noises. In conventional digital control apparatuses, however, the main portions for carrying out and controlling the processing are formed of random access memories, such as a core memory or semiconductor memory, and digital arithmetic control circuits having a positive feed-back loop, i.e., sequential circuits. Thus, external noises are liable to cause so-called intermittent errors. Namely, in such memories and arithmetic circuits partial conditions thereof may be easily reversed by external noises and, if operation is continued, there happens the case where the apparatus continues to give a false output.

On the other hand, in conventional digital control apparatuses, since it is very difficult to discriminate the intermittent error which is a temporary error and an error due to permanent malfunction of the electronic circuits constituting the control apparatus, which is called as a solid error, it is also necessary to stop the operation of the control apparatus at every occurrence of the intermittent errors which form the greater part of the whole errors. Therefore, conventional apparatuses have a drawback that the availability of the apparatus decreases remarkably especially when the apparatus is used in situations of high external noises as described above.

There is proposed an error discriminating method in which a common detecting circuit is used for detecting intermittent errors and solid errors, and when an error is detected the same process is repeated to discriminate the two kinds of errors by the result of the repeated process. This method, however, not only increases the scale of the control apparatus, but also cannot provide sufficient effect.

SUMMARY OF THE INVENTION

An object of this invention is to provide a digital control apparatus having a structure such that intermittent it is difficult to cause errors by external noises.

Another object of this invention is to provide a digital control apparatus in which the occurrence of an intermittent error does not lead to a malfunction which cannot be discriminated from a malfunction caused by a solid error.

A further object of this invention is to provide a digital control apparatus in which the affect of an intermittent error on the control object and duration of the affect are minimized.

A yet further object of this invention is to provide a digital control apparatus which does not provide a false output even when an intermittent error occurs.

Another object of this invention is to improve the reliability of digital control apparatuses installed in situations of extremely large external noises which may cause intermittent errors such as used in control of process, railroad, aviation, ship and automobile transportation or industrial robot.

Another object of this invention is to avoid unnecessary stoppage of the whole system and to increase the availability of the system by minimizing the affect of the intermittent error.

Other objects and advantages of the present invention will be apparent from the following detailed description when read in conjunction with the attached drawings.

BRIEF DESCRIPTION OF THE DRAWING

FIG. 5 is a block diagram of another embodiment of this invention.

GENERAL DESCRIPTION OF THE INVENTION

Figure 1:
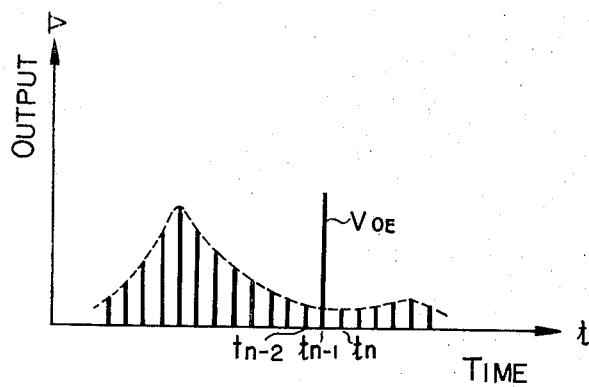
FIGS. 1 and 2 are graphs for illustrating an intermittent error.
Figure 2:
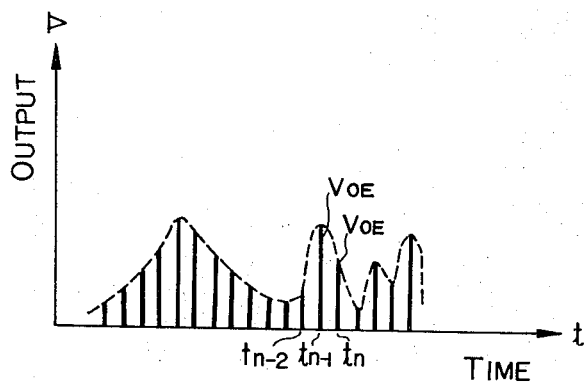

FIGS. 1 and 2 show the affect of an intermittent error E on the output V of a digital control apparatus with respect to time. An error is supposed to occur at time $t$, where $t_{n-2} < t \leq t_{n-1}$. In FIG. 1, the output at time $t_{n-1}$ at which one processing cycle has finished takes a false value $V_{OE}$, but those in the following processing periods $t_{n-1} < t \leq t_n, t_n < t \leq t_{n+1}, \ldots$ take normal values.

There is another case as shown in FIG. 2 in which outputs for all the processing cycles after the occurrence of an error, $t \geq t_{n-1}$, take false values $V_{OE}$. In the case where an intermittent error E gives influences on the output V for a long time, the discrimination from a solid error becomes impossible.

Thus, one essence of this invention is to limit an affect of an intermittent error, if occurs, to only on the output of one processing cycle as shown in FIG. 1.

One feature of this invention for achieving the above is to form control circuits for processing sequences and circuits for storing data or value of constants by combinational circuits which consist of fixed wires, and to form memories for storing intermediate information in the processing, arithmetic registers, static registers, etc. by sequential circuits.

A digital control apparatus includes a unit storing partial procedures which designate the flow of control and a unit for storing data or value of constants, is to be operated by a request command generated from outside or inside of the control apparatus, reads data supplied from the controlled object to perform processing according to the procedure and supplies an output thereto. In conventional apparatuses, however, since procedures and data or value of constants are stored in random access memories such as core memories, semiconductor memories or the like, it happens that the stored contents are reversed by external noises. The reversed contents are maintained thereafter and do not return to the original ones.

The combinational circuit, in contrast to the random access memory, does not include a positive feedback loop and the contents to be stored therein are singly determined by the fixed wiring. Thus, even if noises are received, they cannot be stored in a combinational circuit. Namely, the above feature of the combinational circuit is effective for forming a digital control apparatus which rarely causes intermittent errors when subjected to external noises.

Memories for storing intermediate information, arithmetic registers, static registers, etc. used in carrying out procedures cannot be formed of fixedly wired combinational circuits since the intermediate information is determined on the basis of the result of processing and changes in accordance with the input. Thus, circuits for storing this intermediate information are formed of random access memories and sequential circuits in this invention.

Another feature of this invention lies in resetting the memories and the sequential circuits for storing the intermediate information to predetermined conditions at an arbitrary moment, e.g. at the beginning or the end of each processing cycle.

In the memories and the sequential circuits for storing the intermediate information, the stored content has a significance only in the period of one processing cycle.

Thus, if the contents of the memories and the sequential circuits are reset before processing to a new processing cycle such that the information of the preceeding cycle is not used in the new cycle, an intermittent error, if it occurs in a processing cycle, can be limited to affect on this cycle only.

Namely, the above feature of the present invention is useful for minimizing the affect of an intermittent error on the output.

DESCRIPTION OF THE PREFERRED EMBODIMENTS

A concrete embodiment of this invention will be described, hereinbelow, referring to FIG. 3.

Figure 3:
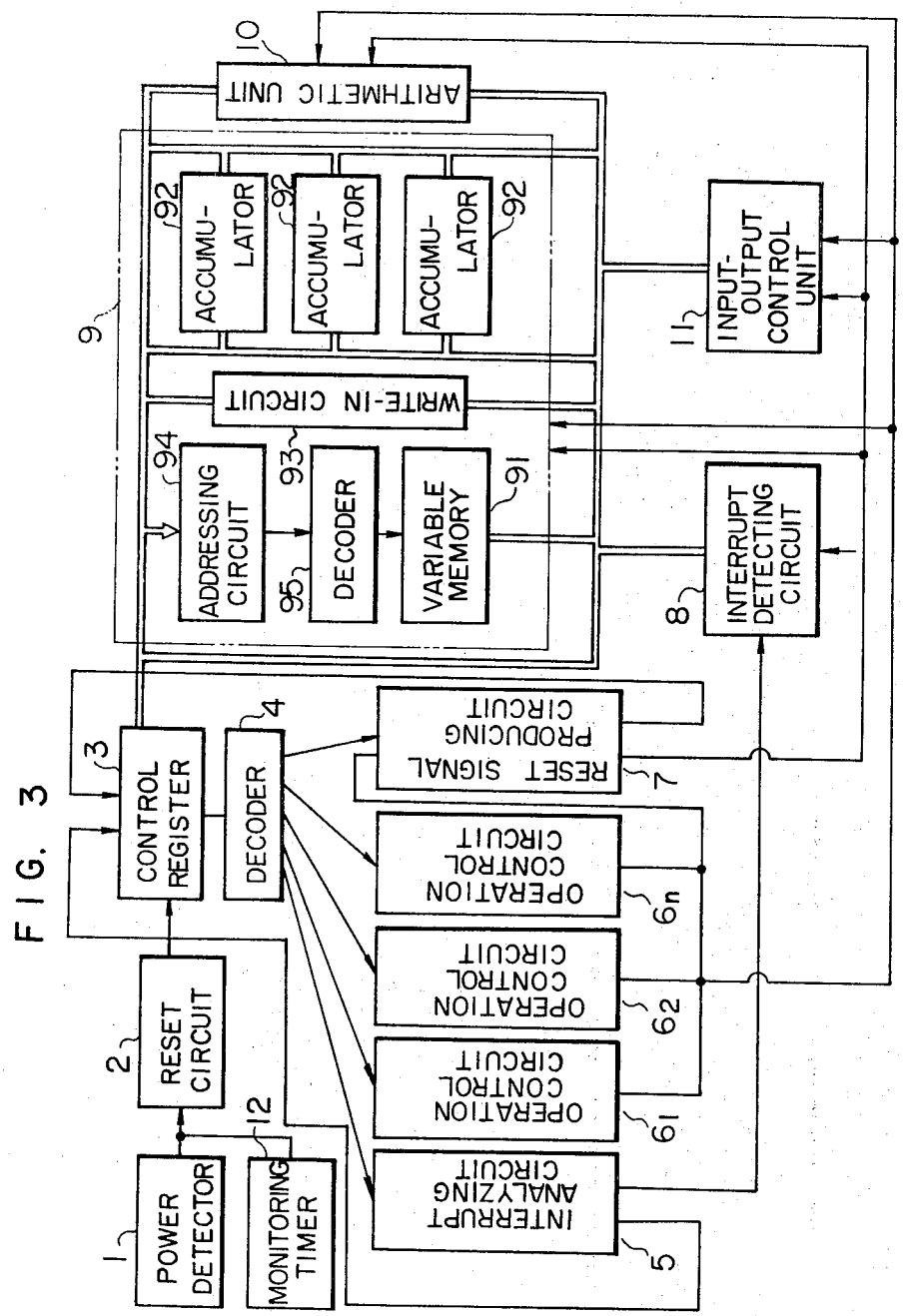
FIG. 3 is a block diagram showing an embodiment of this invention.

In FIG. 3, a power detection circuit 1 supplies a signal to a reset circuit 2 when a power supply (not shown) is turned on. Then, the reset circuit 2 sets a control register 3 into a predetermined initial condition. The content of the control register 3 is decoded in a decoder 4 to select a reset signal producing circuit 7. The output of this reset signal generator 7 is applied to a memory 9, an arithmetic unit 10, and an input-output control unit 11 to reset these units to the initial conditions. These units 9 to 11 include a so-called sequential circuit, the contents of which may be reversed by an external control signal.

The memory 9 includes a variable memory 91 for storing data from the input-output control unit 11 or the arithmetic results from the arithmetic unit 10, accumulators 92, a write-in circuit 93 used in writing data in the selected adress of the variable register 91, an addressing circuit 94, and a decoder 95.

When an interrupt signal is applied from an object to be controlled (not shown) to an interrupt detecting circuit 8 under the state in which the initial conditions of the sequential circuit are set as described above, it is applied to the control register 3. Then, the content of the register 3 is decoded in the decoder 4 and an interrupt analyzing circuit 5 is selected. This interrupt analyzing circuit 5 reads out the interrupt signal detected in the interrupt detecting circuit 8 and analyzes what kind of operational control is requested by the controlled object.

Figure 4:
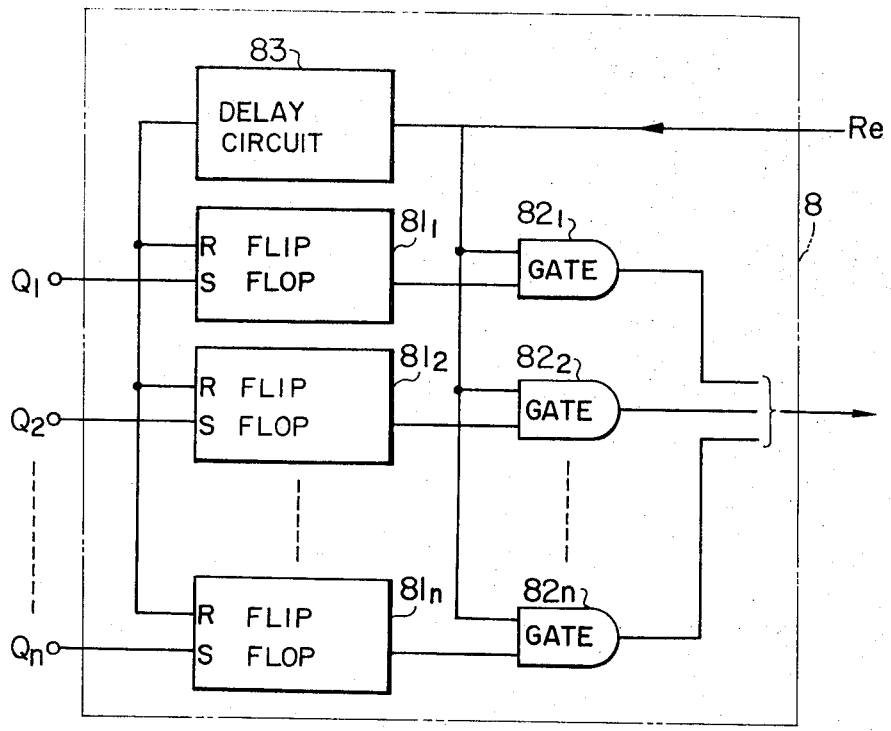
FIG. 4 is a block diagram showing the structure of an intermittent detecting circuit used in the embodiments of this invention.

The interrupt detecting circuit 8 may be formed as is shown in FIG. 4, which consists of flip-flop circuits $81_1$ to $81_n$ which are set by request signals $Q_1$ to $Q_n$ from the controlled object, AND gates $82_1$ to $82_n$, and a delay circuit 83. When a read signal Re from the interrupt analyzing circuit 5 is supplied, the gates 82 are opened to send out the outputs of the flip-flops 81 which have been set. The read signal is also applied to the reset terminals of the flip-flops 81 through the delay circuit 83 to reset the flip-flops. Thus, the supply of the interrupt signal from the detecting circuit 8 is stopped when a predetermined period has passed from the generation of the signal Re from the interrupt analyzing circuit 5.

The interrupt analyzing circuit 5 generates a signal corresponding to the interrupt signal (corresponding to the operational control requested by the controlled object), which is applied to the control register 3 and decoded in the decoder 4. Thereby, an operation control circuit corresponding to the demand of the controlled object is selected from operation control circuits $6_1$ to $6_n$. Here, let us suppose that the operation control circuit $6_1$ is selected. Then, the constant data nondestructively stored in the operation control circuit $6_1$ and input data derived from the controlled object through the input-output control unit 11 are stored in the memory 9 according to the procedure which is formed of fixed wires in the circuit $6_1$. Further, the arithmetic operation designated by the procedure is carried out in the arithmetic unit 10 through the use of the input data. The result of this operation is stored in the memory again. Then, the processed output data is supplied to the control subject through the input-output control unit 11.

When the procedure set in the operation control circuit $6_1$ has been carried out, the output of the circuit $6_1$ activates the reset signal producing circuit 7 the output of which reset the control register 3, the memory 9, the arithmetic unit 10, and the input-output control unit 11 to the initial conditions.

When another interrupt signal is detected in the interrupt detecting circuit 8, an operation control circuit corresponding to that interrupt signal is activated. Until the interrupt detecting circuit 8 is reset by the signal of the interrupt analyzing circuit 5, the same procedure of the operation control circuit is repeated.

It is to be noted here that in this invention the portions corresponding to the program and the data or information indicative of constants in the usual computer are formed either of combinational circuits (read only memories) or the semi-fixed logic circuits which have a far larger threshold voltage for writing than that for reading and thereby cannot usually be rewritten by intermittent errors. Such a semi-fixed logic circuit is never rewritten by the usual operation of the device or the usual noises, and hence can generally work as a combinational circuit.

Each of the memory 9, the arithmetic unit 10, and the input-output control unit 11 includes a sequential circuit and thus the content thereof may be reversed by intermittent errors. The procedures and the data or value of constants are, however, formed of fixed wires (read only memory) in the operation control circuits $6_1$ to $6_n$ consisting only of combinational circuits and are never altered by intermittent errors. Even if the content of the sequential circuit in the memory 9, the arithmetic unit 10, and/or the input-output control unit 11 happens to be reversed and the resultant output through processing is false, since these units 9 to 11 are necessarily reset to the initial conditions on completion of the procedure corresponding to one operation control unit, the false output is generated only in one cycle of the procedure and a true output can be generated in the next procedure. In other words, even if a false output may be generated at the moment $t_{n-1}$ shown in the graph of FIG. 1, it can be replaced with a correct output in the next cycle of the procedure beginning at the time of $t_n$.

It can happen, however, that the operation control circuits $6_1$ to $6_n$ cause a dynamic stop during the operational control, i.e., a malfunction such that the device repeats one operation infinitely and generates no output. This is usually called as "nesting" and happens, for example, in such a case where an operational control shifts into the sequence of a common circuit on the way of the procedure and, on the return to the original operational control after the common sequence has been finished, the content of the memory storing the address of the returning point is rewritten by an intermittent error.

In order to minimize the errors due to such phenomena, a monitoring timer 12 is provided. When a certain period of time has passed from the beginning of an operational control corresponding to a certain interrupt signal but no output has been provided from the input-output control unit, the monitoring timer 12 supplies a signal to the reset circuit 2. Then the reset circuit 2 is activated to reset the control register 3 forcedly to the initial conditions.

Figure 6:
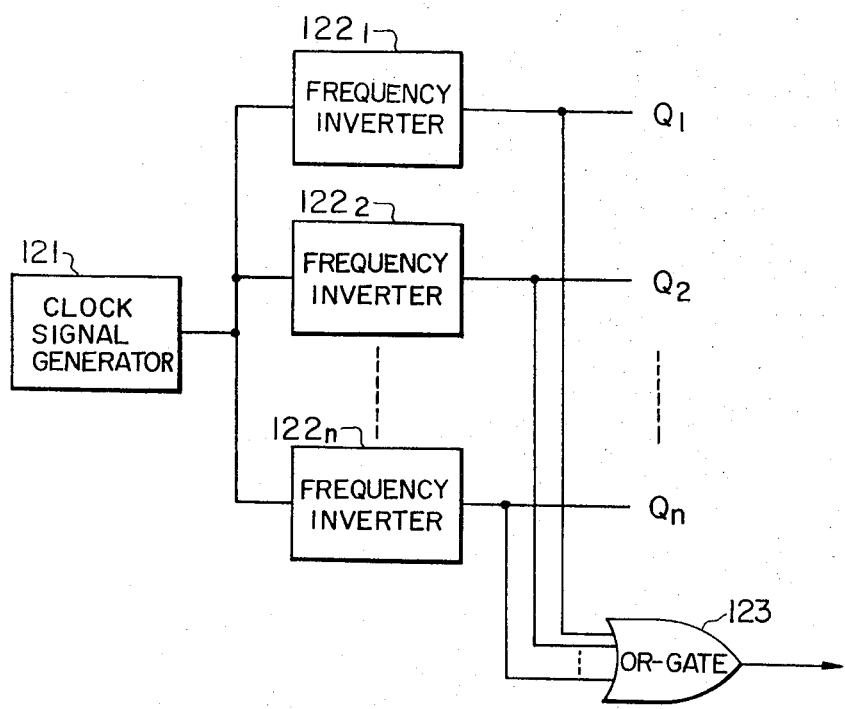
FIG. 6 is a block diagram of a timer circuit used in the embodiment of FIG. 5.

FIG. 5 is a block diagram of another embodiment of this invention, in which the same parts as those in FIG. 3 are designated by the same reference numerals. A timer circuit 12' is formed of a clock signal generator 121, frequency converters $122_1$ to $122_n$ and an OR-gate 123 as is shown in FIG. 6. The signal of a frequency $f_o$ generated by the clock signal generator 121 is supplied to the frequency converters $122_1$ to $122_n$ and converted into the signals of frequencies $f_1$ to $f_n$ therein. The outputs $Q_1$ to $Q_n$ of the frequency converters $122_1$ to $122_n$ are applied to the interrupt detecting circuit 8 in parallel. The pattern made of these signals $Q_1$ to $Q_n$ periodically changes. Selection among the operation control circuit $6_1$ to $6_n$ is made according to that pattern to regularly carry out the procedure of the selected operation control circuit. The outputs of the frequency converter circuits 122 are also applied to the reset circuit 2' through the OR-circuit 123. This reset circuit 2 generates an output at each time when the output of the OR-circuit 123 is applied and resets the sequential circuits of the memory 9, the arithmetic unit 10, and the input-output control unit 11 to reset them to their initial conditions.

By the above structure, the units 9 to 11 are forcedly reset to the initial conditions at every period of a constant time regardless of the progress of the procedure of the operation control circuit.

In the above embodiment, the use may be made of the synchronizing signal from the controlled object without the provision of the clock signal generator 121. This synchronizing signal of an external system may not inevitably coincide with the starting signal of the operation control circuit 6. For example, if the reset circuit 2 is driven by the synchronizing signal and an interrupt signal is applied to the interrupt detecting circuit 8 after a certain period of time, the sequential circuits of the memory 9, the arithmetic unit 10 and the input-output control unit 11 are reset to the initial conditions when the procedure is to be carried out by the operation control circuit 6.

In the circuit of FIG. 5 in which the reset circuit 14 is activated at a certain period to forcedly reset the units 9, 10 and 11 to the initial conditions, the nesting monitoring timer 12 in the circuit of FIG. 3 is not necessary. In such cases, even if nesting occurs, the device can erase the nesting state within a certain period by the activation of the reset circuit 14.

Figure 7:
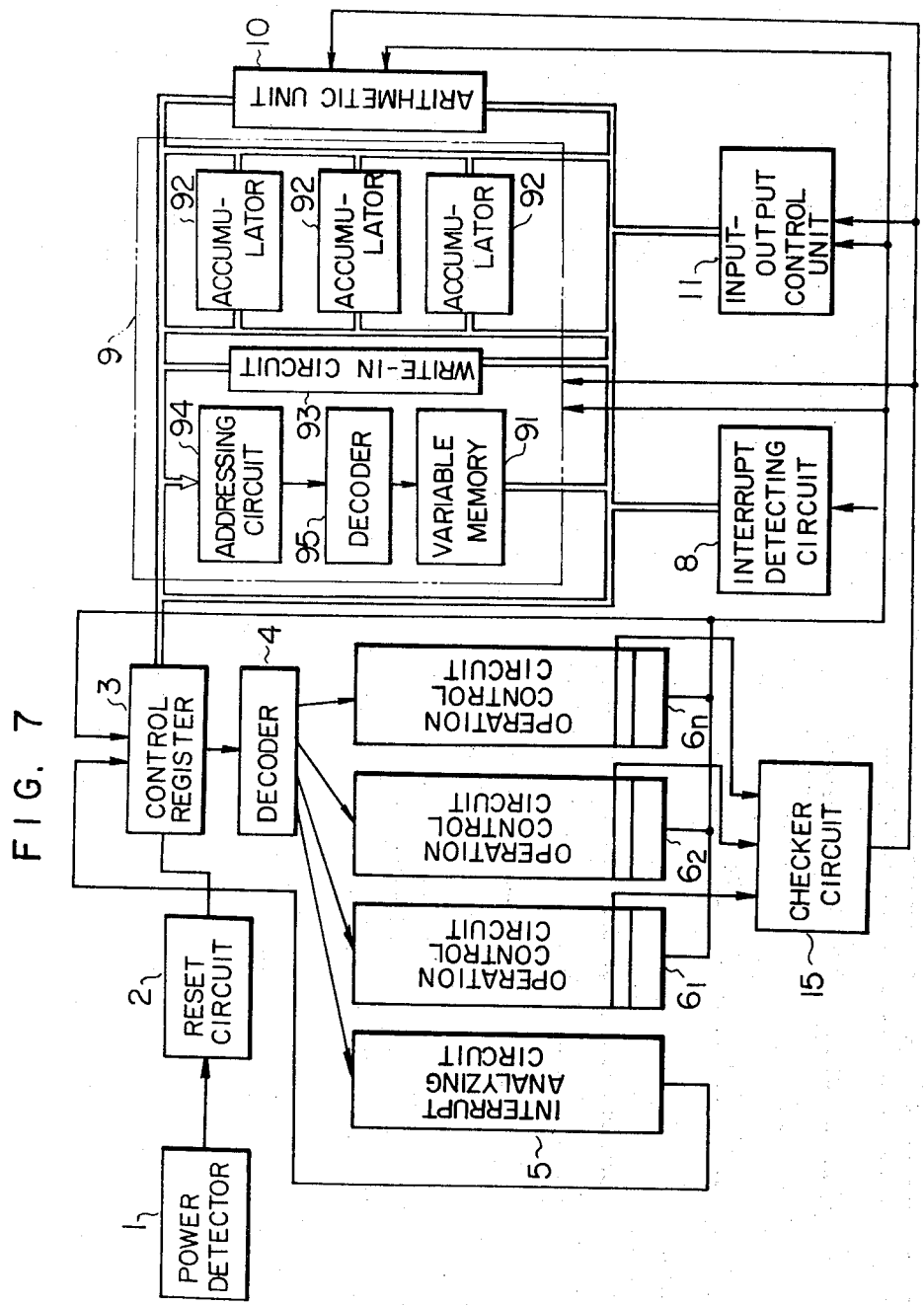
FIG. 7 is a block diagram of another embodiment of this invention.

FIG. 7 shows another embodiment in which a checking circuit 15 is provided common to all the operation control circuits $6_1$ to $6_n$. The checking circuit 15 is activated to check whether an intermittent error has occurred in the memory 9, the arithmetic unit 10, or the input-output unit when the predetermined operational control has been carried out according to the procedure set in the operation control circuit 6 and before the result is supplied to the external device (controlled object) through the input-output control unit 11. If an error has occurred, the input-output control unit 11 generates the same output as that of one cycle before, or no output, takes a necessary measure appropriate to the controlled object. If necessary, the same operational control can be carried out again to separate an intermittent error from a solid error.

Various methods are possible for checking the existence or absence of an intermittent error in said units 9 to 11 by the use of said checking circuit 15. The present device is used for the control in railway, air or automobile transportation as described before, and this means that the device is used in a place of large noise. Thus, the possibilities that the states of the sequential circuits of said respective units 9 to 11 are reversed by a noise can be considered as of the same order. Thus, the existence of errors in all the units 9 to 11 which include sequential circuits can be detected by checking the existence of an intermittent error in a particular area of said units 9 to 11.

For example, in the variable memory 91 of the memory 9 patterns of all 0 and 1 are set in every predetermined area, and the contact of this area may be checked by said checking circuit 15. Alternatively, patterns of all 0 and all 1 may be set in part of the accumulator 92 in the memory 9. When a part of all 0 or all 1 pattern is reversed by external noises, this reversal can be detected by gate circuits etc. which are fixedly wired, to indicate the occurrence of an intermittent error. As a matter of course, the content of the memory 9 can be reversed by a solid error. Discrimination between a solid and an intermittent error can be achieved through performing the same checking operation several times repeatedly. When several repeated checks give the same error, the error should be considered as a solid error.

When and in what area the detection pattern is to be set in a part of the memory 9 may also be determined by the arithmetic unit 10. The checking circuit 15 may be added to either of the circuit of FIG. 3 or the circuit of FIG. 5.

The group of the sequential circuits is used for temporarily storing information. In the system of FIG. 7, such sequential circuits are forcedly reset. If temporary memory circuits which lose the stored information at a time constant corresponding to said forced resetting period are used for the group of sequential circuits, the forced resetting becomes unnecessary.

For example, dynamic memories or registers utilizing the parasitic capacity of MOS type field effect transistor can be used for such a purpose.

This invention aims at minimizing the affect of a temporary false output on the controlled object when it happens to occur, or to detect the error and suppress the output. Thus, even in the case where the apparatus does not include a circuit for detecting intermittent errors, the affect of an intermittent error can be reduced such that it is almost negligible if the arithmetic circuit is run to carry out the same operation repeatedly within one processing cycle of the apparatus so that the average of the output values may be supplied to the controlled object.

Figure 8:
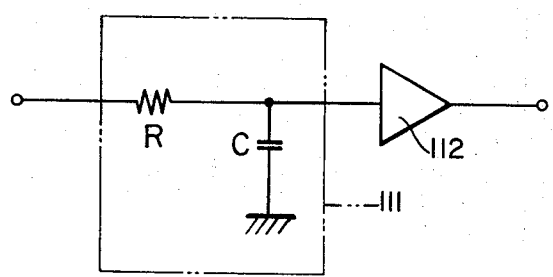
FIG. 8 is a schematic diagram of a output circuit used in the embodiments of this invention.

For this purpose, a low pass filter 111 consisting of a resistor R and a capacitor C and an amplifier 112 as shown in FIG. 8 may be provided in the input-output control unit 11 to supply the output of the amplifier 112 to an external device (controlled object).

When the circuit is formed in the above manner, even if an intermittent error as shown in FIG. 1 occurs, the signal having the envelope shown by the broken line will be supplied to the external device and hence the external device receives almost no influence of the intermittent error. Practically, the time constant of this RC circuit may be selected as several tens times larger than the repeating period of the processing by the arithmetic unit 10.

As is apparent from the foregoing description, according to this invention, even if the contents of the sequential circuits of the memory 9, the arithmetic unit 10, and the input-output unit 11 are reversed by noises and an intermittent error occurs, the error of the output supplied from the input-output control unit to outside can be retained in one processing cycle or can be completely suppressed. Therefore, the reliability of control can be extremely improved.

We claim:
1. A digital control apparatus comprising:
    an input-output control unit for receiving input data from and supplying output data to a controlled object;
    an arithmetic unit for carrying out processing on the basis of the data derived from said input-output control unit;
    a random access memory for storing intermediate information of said processing;
    operation control unit including procedures for controlling the sequences of processings and value of constants required for the processings, said operation control unit consisting of a plurality of operation control circuits each of which is formed of a fixedly wired combinational circuit; and
    means for resetting the contents of said input-output control unit, arithmetic unit, and memory to the initial conditions prior to starting the execution of each processing.

2. A digital control apparatus according to claim 1, further comprising:
    an interrupt detecting circuit for detecting an interrupt signal from the controlled object;
    an interrupt analyzing circuit for analyzing the content of the processing which is requested by the controlled object; and
    a control register for selectively activating one of said operation control circuits corresponding to the processing required by the result of said analysis.

3. A digital control apparatus according to claim 2, in which said reset means is activated by the ending signal of the execution of a procedure designated by the selected operation control circuit to reset the input-output control unit, the arithmetic unit and the memory to the initial conditions.

4. A digital control apparatus according to claim 1, in which said reset means includes means for generating clock signals of a constant period of time, and a reset circuit activated by said clock signal for resetting the input-output control unit, the arithmetic unit and the memory to the initial conditions.

5. A digital control apparatus according to claim 2, further comprising:
    a clock signal generator for generating clock signals of a constant period of time;
    frequency converter circuits for providing a plurality of signals of respectively different frequencies from said clock signal; and
    means for applying a periodically altering pattern formed of the outputs of said frequency converter circuits to said interrupt detecting circuit;
    thereby regularly selecting one of said operation contol circuits.

6. A digital control apparatus according to claim 1, further comprising a low-pass filter having a sufficiently larger time constant than the repeating frequency of the arithmetic unit, through which the output of the arithmetic unit repeatedly performing the same processing as previously carried out is supplied to the controlled object.

7. A digital control apparatus according to claim 2, further comprising a checking circuit, said checking circuit being activated by the output of the selected operation control circuit when an operational control has been done in accordance with the procedure of the selected operation control circuit and before the result is supplied to the controlled object through the input-output control circuit to detect an intermittent error in the memory, the arithmetic unit and the input-output control unit.

* * * * *